United States Patent
Brotz

[11] Patent Number: 6,116,784
[45] Date of Patent: Sep. 12, 2000

[54] DAMPENABLE BEARING

[76] Inventor: Gregory R. Brotz, P.O. Box 1322, Sheboygan, Wis. 53081

[21] Appl. No.: 09/226,268

[22] Filed: Jan. 7, 1999

[51] Int. Cl.⁷ ..................................................... F16C 27/00
[52] U.S. Cl. ............................ 384/99; 384/582; 248/566; 248/638; 52/167.5
[58] Field of Search ................................ 384/36, 99, 535, 384/536, 581, 582; 248/566, 638; 52/167.1, 167.2, 167.4, 167.5, 167.6

[56] References Cited

U.S. PATENT DOCUMENTS

| | | | |
|---|---|---|---|
| 4,869,476 | 9/1989 | Shtarkman | 248/566 X |
| 4,909,489 | 3/1990 | Doi | 248/566 X |
| 5,076,403 | 12/1991 | Mitsui | 384/99 X |
| 5,174,552 | 12/1992 | Hodgson et al. | 2478/638 X |
| 5,452,957 | 9/1995 | Duggan | 384/99 |
| 5,462,361 | 10/1995 | Sato et al. | 384/99 X |
| 5,730,531 | 3/1998 | Pinkos et al. | 384/99 |
| 5,902,048 | 5/1999 | Duggan | 384/99 |

*Primary Examiner*—David A. Bucci
*Assistant Examiner*—Colby Hansen
*Attorney, Agent, or Firm*—William Nitkin

[57] ABSTRACT

A dampening bearing support member having a plurality of bearings disposed between an object and a base with rheological fluid disposed around the bearings and structure to retain the rheological fluid in such position, with the rheological fluid being under the control of the user at times when it is desired to stiffen the rheological fluid and limit or prevent movement of the bearings and the object in relation to the base.

10 Claims, 4 Drawing Sheets

DAMPENABLE BEARING

BACKGROUND OF THE INVENTION

1. Field of the Invention

The device of this invention is a dampenable bearing that is adjustable, such bearing in a first mode having the ability to move laterally and in a second mode being fixed in position and more particularly relates to a bearing structure having a plurality of ball bearings disposed between two electrode plates with an electro or magneto rheological fluid disposed between such plates and ball bearings, which device, upon activation and resulting stiffening or solidification of such rheological fluid, slows down movement and can dampen movement to the point of preventing movement of such bearings, thereby fixing the positioning of such plates in relation to one another.

2. Description of the Prior Art

There are some situations when a work piece, machine or other object requires adjustable movement dampening from a point of allowing movement to a point of preventing movement. Movement dampening in the prior art can be accomplished by having wheels on an object which wheels can be adjusted to move freely or can be adjusted to have resistance to movement or to have no movement whatsoever in order to limit or prevent movement of the object.

SUMMARY OF THE INVENTION

It is an object of this invention to provide an improved dampening mechanism between an object such as a work piece and its base support. Such dampeners can be used as machine movement dampeners, dampeners for movement on optical benches or even dampeners to the movement of buildings in environmental situations such as earthquakes. During an earthquake, resilient movement of a building may be desirable to prevent damage to the building structure and at other times when there is no earthquake it would be desirable to retain the structure in a more rigid, fixed manner. In order to create the desired object movement dampener, the invention herein provides for an object mounting plate disposed above a base and separated therefrom by a plurality of bearings therebetween. Ball bearings are illustrated, but other types of bearings could be substituted therefor such as roller bearings. Other types of bearings are to be considered within the scope of this invention and whenever ball bearings are described, it should be understood that other types of bearings could be utilized in their place. Initially the mounting plate on which the object or work piece is attached can freely move around in position on top of the ball bearings rolling on the base. Beneath the mounting plate is an upper electrode plate and above the base is a lower electrode plate with a flexible retaining member such as an elastic ring connecting the upper electrode plate and lower electrode plate. An electro or magneto rheological fluid is disposed between the upper electrode plate and lower electrode plate and fills the spaces between the ball bearings. In one embodiment an electric current is conducted between the upper electrode and lower electrode plates, when desired, which thickens and then solidifies the electro rheological fluid, depending on the current intensity. If a magneto rheological fluid is used, a magnetic field can be applied to such magneto rheological fluid to stiffen it which process also limits the ability of the ball bearings to move and dampens the ability of the object or work piece attached to the mounting plate to move in relation to the base. Electro or magneto rheological fluid having similar properties to ferro fluids which are magnetic can help make good seals between the bearings' fluid-containing members forming the bearing confinement chamber so as to help prevent fluid leakage. The confinement chamber can also be embodied in other shapes from that shown, such as bellows-shaped, which shape can also accomplish the goals of this invention.

DESCRIPTION OF THE PREFERRED EMBODIMENT(S)

Figure 1:
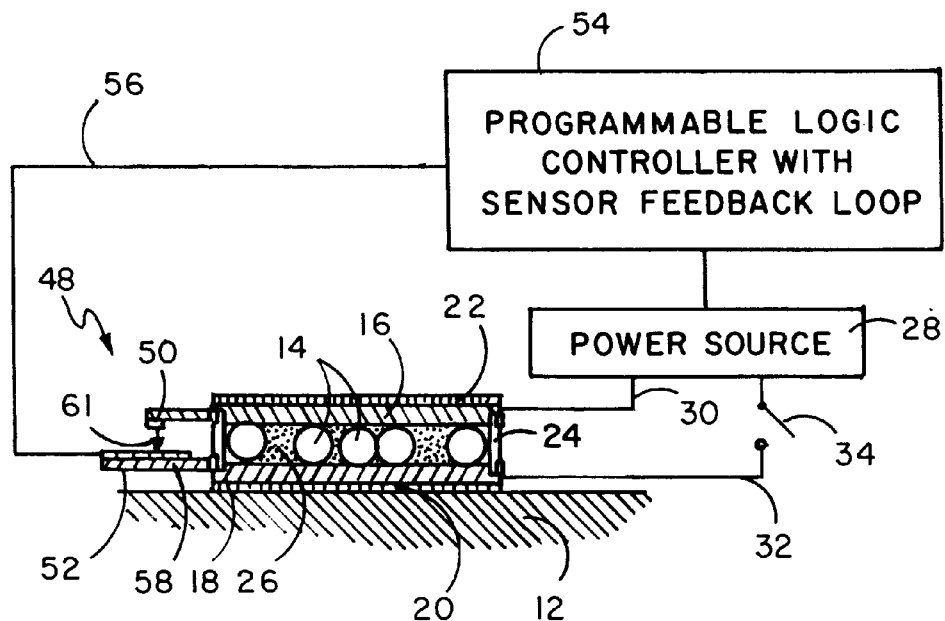
FIG. 1 illustrates a cross-sectional elevational side view of the device of this invention, showing the mounting plate disposed above the ball bearings which roll on a base.
Figure 2:
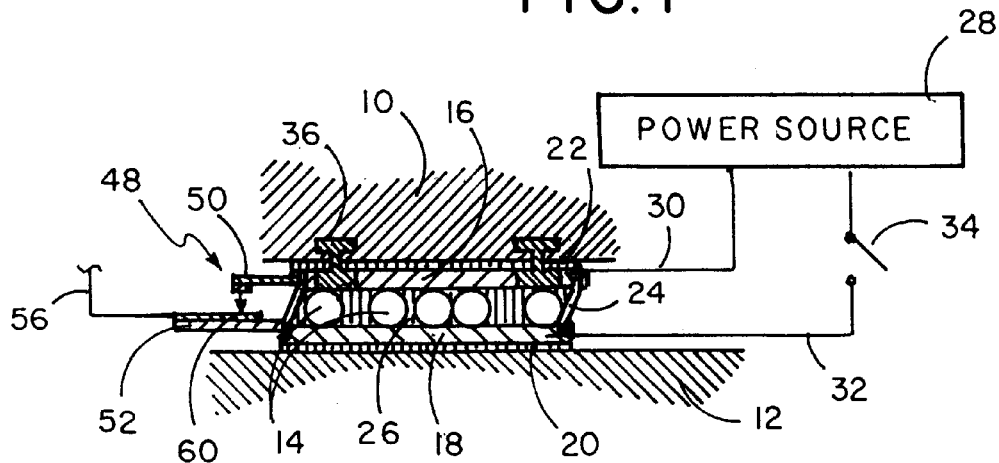
FIG. 2 illustrates the device of FIG. 1 with the object and mounting plate being laterally moved to one side.

FIG. 1 illustrates a side view of the device of this invention wherein mounting plate 22 is disposed above base 12. Separating mounting plate 22 from base 12 is a plurality of ball bearings 14. Between object 10 mounted on mounting plate 22, as seen in FIG. 2, and the tops of ball bearings 14 is upper electrode plate 16, and between the bottoms of the ball bearings 14 and base 12 is lower electrode plate 18. Lower electrode plate 18 is affixed to base plate 20. Surrounding the upper electrode plate/ball bearings/lower electrode plate sandwich is a retaining member such as elastic ring 24 which contains and holds the electro rheological fluid or magneto rheological fluid 26 therein around ball bearings 14. Although a plurality of ball bearings is seen in this cross-sectional view, it should be noted that more or less ball bearings can be utilized depending upon the structure of the object being supported. When utilizing electro rheological fluids, in most cases it is desirable that the bearings be made of an electrically nonconductive material. Rubber balls can be used as ball bearings to provide vertical cushioning qualities to the bearings. Also, although a round shape for the bearing is shown, other bearing shapes can be utilized. A power source 28 can be attached, with first electrical pole power line 30 connected to upper electrode plate 16 and second electrical pole power line 32 running to lower electrode plate 18 with a switch 34 on such line to complete the connection when desired to power source 28.

Figure 3:
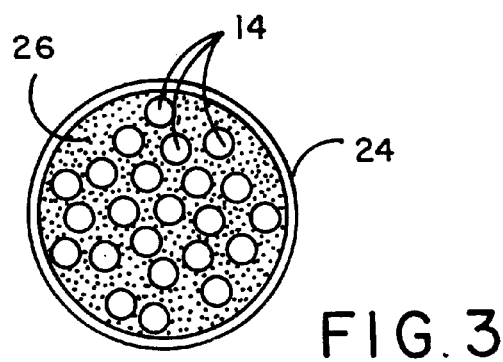
FIG. 3 illustrates a top cross-sectional view of the device of FIG. 1, showing the elastic retaining ring with a plurality of ball bearings and rheological fluid disposed therein.

FIG. 3 illustrates a top view of the device of FIG. 1, showing elastic ring 24 with a plurality of ball bearings 14 disposed within rheological fluid 26.

As also seen in FIG. 2, object 10, whose movement is to be dampened, can be engaged to mounting plate 22 by many different methods such as by means of interlock structure 36. In this way the movement of the object, work piece or other structure can occur when the power is off and the rheological fluid 26 is a free-flowing liquid, offering little resistance to the ball bearings' movement. Elastic ring 24, as seen in FIG. 2, can move laterally while still containing fluid 26 therein but yet allowing a range of movement of the object. In some cases it is desirable to sense the amount and direction of movement of the bearing in which case a sensor 48 can be utilized. The sensor can take many forms, but what is illustrated is a sensor with a beam projector 50, such as an LED or laser beam producing chip which directs beam 61, as seen in FIG. 1, against a receiver plate 52. The position of the beam projector 50 is fixed to upper electrode plate 16. Receiver plate 52 can sense where it has been struck by beam 61. Receiver plate 52 is attached to lower electrode plate 18 such that as upper electrode plate 16 moves in relation to lower electrode plate 18, sensor 48 moves in relation to receiver plate 52 so that its first position 58, as seen in FIG. 1, moves to second position 60, as seen in FIG. 2, the position of which indicates the current position of beam projector 50. Controller system 54 having a programmable logic with a sensor feedback loop is attached by third power line 56 to receiver plate 52. Controller 54 can also control the amount of power coming from power source 28 which power can be variable so as to control the degree of stiffening of rheological fluid 26 when desired. Controller 54 is not seen in FIG. 2 but can be provided therein as seen in FIG. 1, and such sensor system can also be used for magneto rheological fluids, as are used in FIG. 4, by sensing the object location in relation to the base and when desired increasing or decreasing the intensity of the power to the electromagnets. The retaining member can take other shapes that are not rings that conform to the shape of the plates so long as the retaining member is flexible. When switch 34 is closed, current passes through electro rheological fluid 26, and the fluid stiffens to a point of stopping the movement of the ball bearings and causing the movement of the object thereabove to be dampened and/or stopped, as desired by the user.

Figure 4:
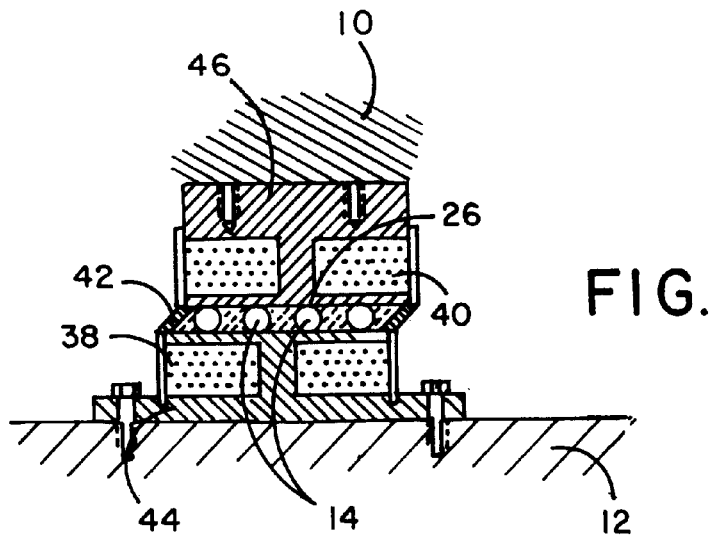
FIG. 4 illustrates a cross-sectional elevational side view of the device of this invention with magnetic field coils in the mounting plate and base and with magneto rheological fluid disposed between the ball bearings.

FIG. 4 illustrates a further embodiment of the device of this invention where pairs of magnetic field coils 38 and 40 are disposed within upper structure 46 and/or lower structure 44, respectively, such that, for example, when a magnetic field is created by running an electric current from a power source, not shown, through field coils 38 and 40, the magneto rheological fluid 26 becomes stiffened and solidified therebetween, preventing lateral movement of ball bearings 14 and thereby preventing movement of object 10 held on upper structure 46. The ball bearings in a magneto rheological fluid device do not have to be electrically insulative and could be made of metal, if desired.

Figure 5:
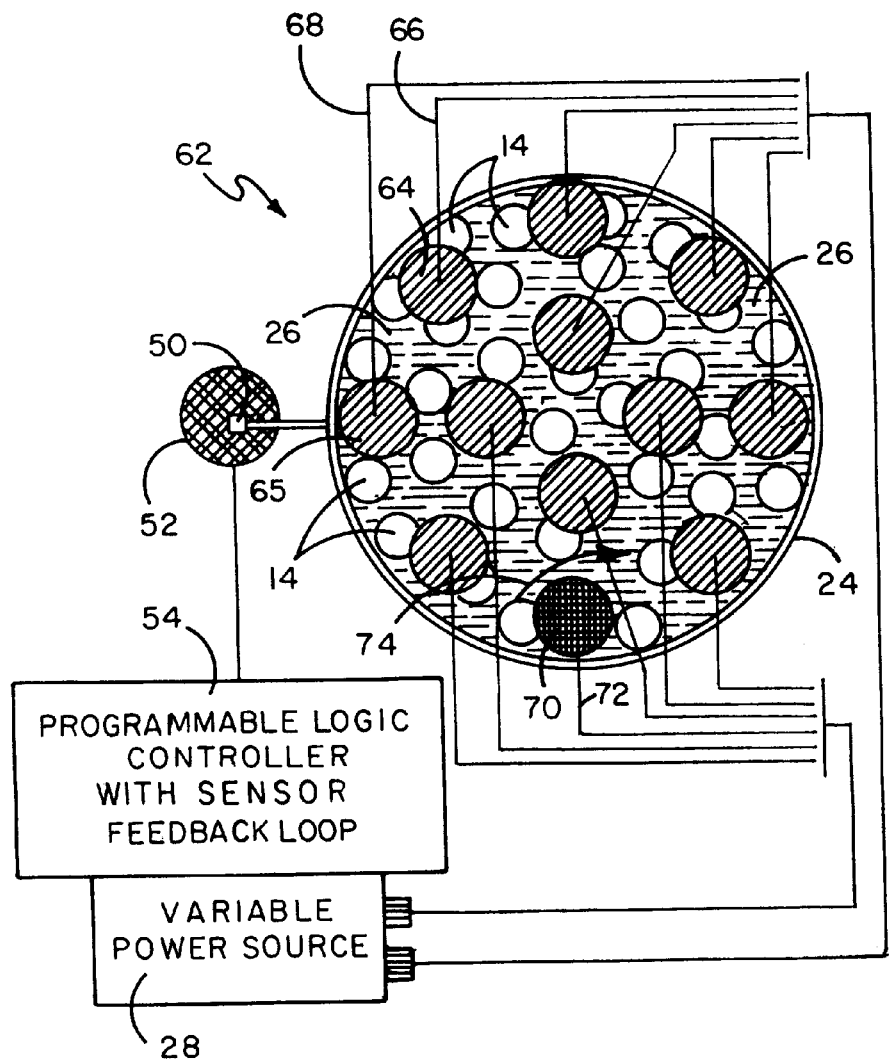
FIG. 5 illustrates a top cross-sectional view of an alternate embodiment of the device of this invention utilizing multiple individually controlled electrodes.

FIG. 5 illustrates a top cross-sectional view of yet a further embodiment wherein ball bearings 14 with rheological fluid 26 therebetween are contained within elastic ring 24. In this embodiment the upper electrode is made from a plurality of discrete electrodes such as first electrode 64 and second electrode 65 which are interconnected separately and respectively by first and second electric lines 66 and 68 to power source 28. The lower electrode can also be similarly configured. The individual electrodes are separately activated through their own power line such as activated electrode 70, receiving its power through line 72. By sequencing the position of the electric field, portions of the rheological fluid 26 can be solidified while other portions remain fluid which differentiation can effect movement in the bearing such as in a curvilinear direction indicated by arrow 74. The programmable logic controller 54 can sense the movement of beam projector 50 over receiver plate 52 to acquire information as to the exact position of the bearing and to control the activation of selected electrodes to allow a desired movement or resistance to movement. It should be noted that although electrode plates are shown in FIG. 5, the same formation could be substituted for utilizing electromagnets so that there would be a plurality of discrete individually activatable electromagnets for use with magneto rheological fluid.

Figure 6:
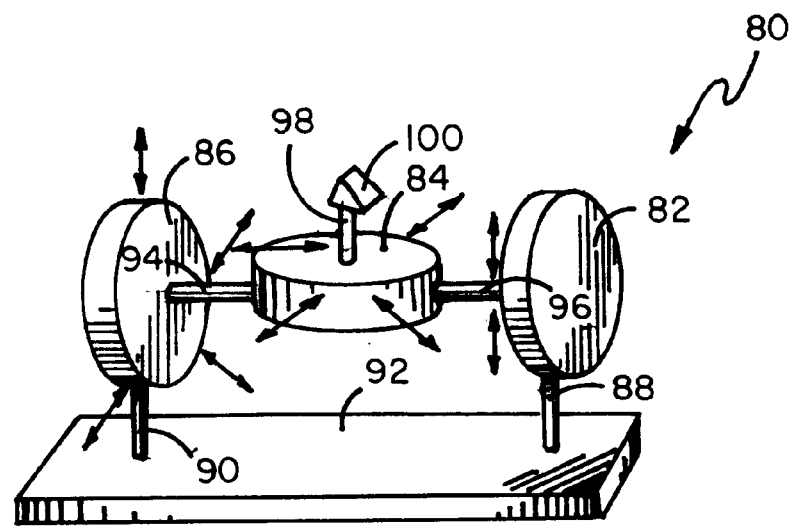
FIG. 6 illustrates a perspective view of multiple devices of this invention utilized to support an object.

FIG. 6 illustrates a multiple dampening bearing device 80 in use. In this embodiment vertically disposed first and third dampening bearings 82 and 86 are mounted, respectively, on bearing supports 88 and 90 which in turn are held on fixture 92. Supported between first dampening bearing 82 and third dampening bearing 86 is a horizontally disposed second dampening bearing 84 held between first connector 94 and second connector 96. The utilization of this structure allows movement of an object, such as prism 100, held on object supporter 98. Arrows depict various directions of movement allowable by the dampening bearings of this invention which movement can be selectively controlled.

Figure 7:
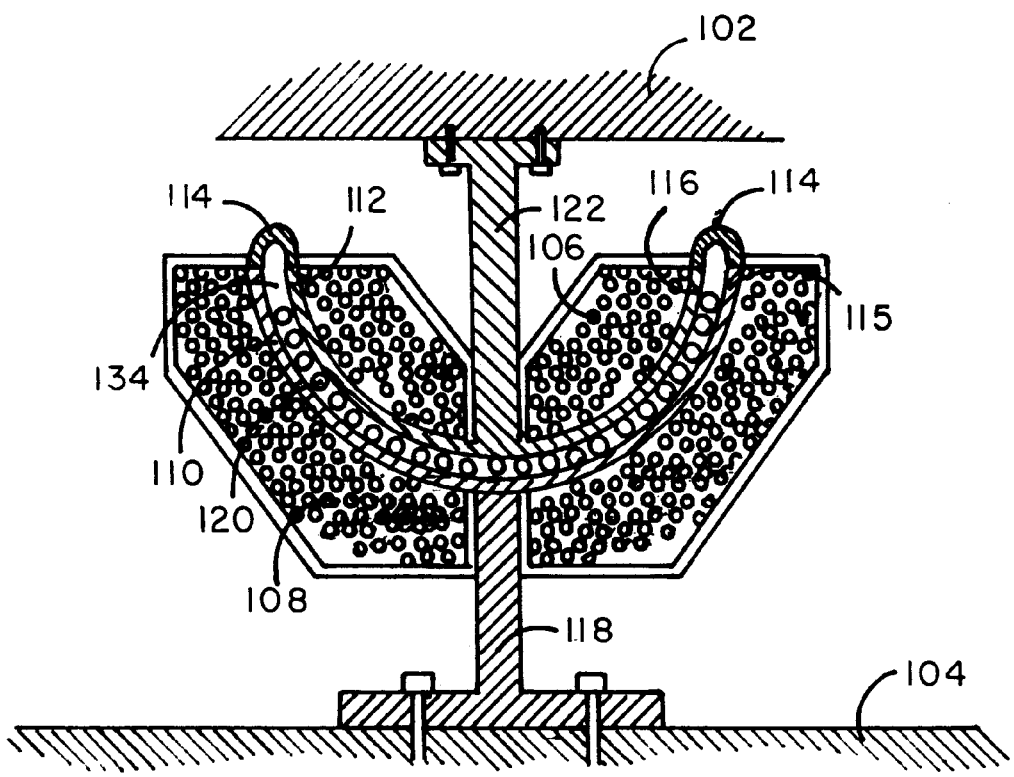
FIG. 7 illustrates a cross-sectional, elevational side view of the device of this invention utilizing a curved plane of bearings.
Figure 8:
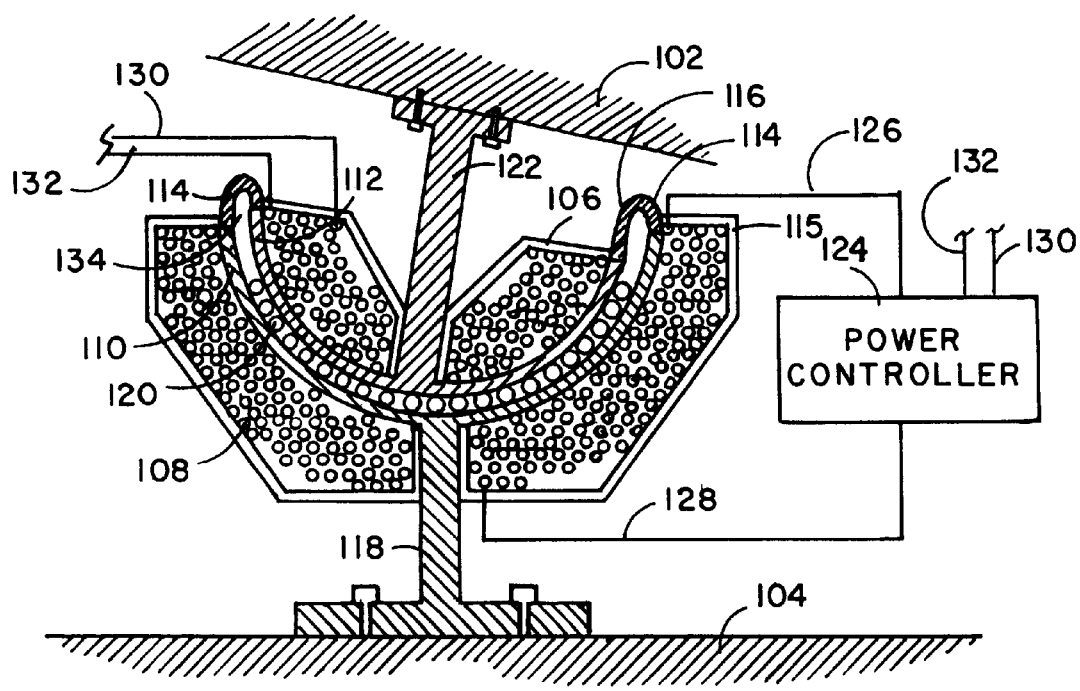
FIG. 8 illustrates the side view of FIG. 7 with the object displaced in relation to its base.

In yet another embodiment as illustrated in FIGS. 7 and 8, a curved bearing surface is illustrated, creating a multi-directional rotational semi ball and socket-type arrangement where object 102 is disposed in adjustable positioning above base 104. Bearings 120, which can be ball bearings, are disposed between first half-sphere member 110 and second half-sphere member 112. At the first and second edges 115 and 116, respectively, of first and second half-sphere members 110 and 112 is flexible wall 114 which forms an enclosure to hold magneto rheological fluid 134 between first and second half sphere members 110 and 112 and bearings 120. Object 102 is supported on stem 122 attached to second half sphere member 112 and can move in relation to base 104, as seen in FIG. 8. When the dampening of such movement is desired, power controller 124 directs current through first electrical line 126 and second electrical line 128 to lower electromagnet 108; and third and fourth electrical lines 130 and 132 direct electrical current to upper electromagnet 106. The activation of upper and lower electromagnets 106 and 108 stiffen and then solidify magneto rheological fluid 134 so as to dampen the movement of object 102 in relation to base 104. The ability to move stem 122 at angles in relation to support stem 118 not only can be used advantageously for various objects in relation to a base, but also if stem 122 and support stem 118 are utilized as rotational shafts can allow angular movement of the respective shafts in relation to one another. The first and second half spherical members 110 and 112 can be molded or otherwise formed of very rigid material.

Figure 9:
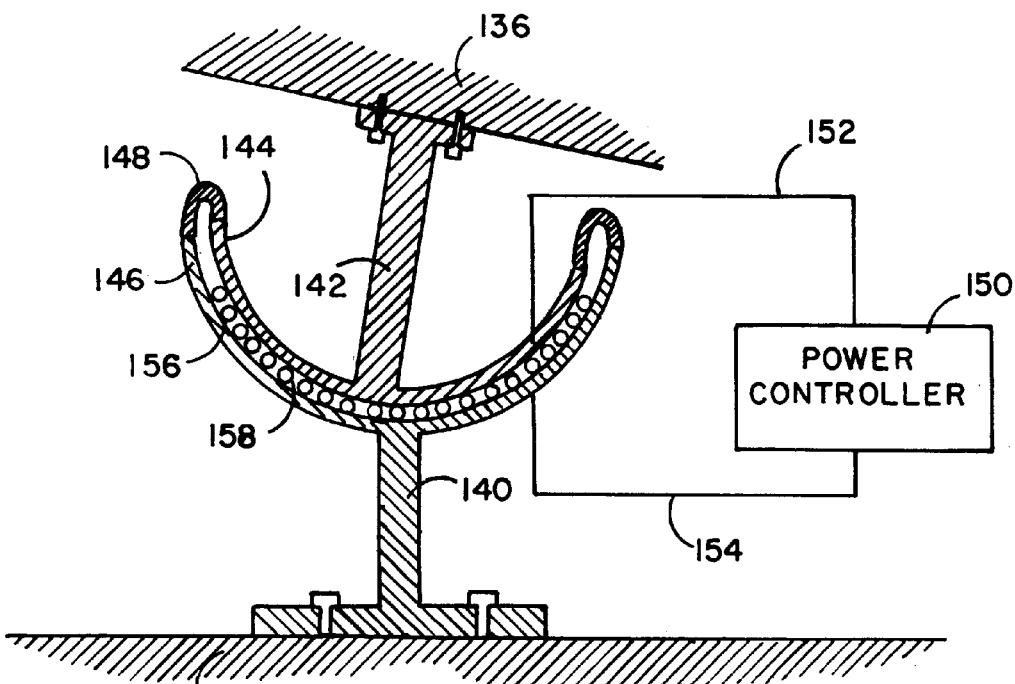
FIG. 9 illustrates a cross-sectional elevational side view of the device of this invention utilizing a curved plane of bearings and electro rheological fluid.

In a similar embodiment seen in FIG. 9 a bearing surface can be utilized formed of first curved electrode 144 and second curved electrode 146 which is concentric to said first curved electrode 144, said electrodes having bearings 156 and electro rheological fluid 158 disposed therebetween. The ends of first and second curved electrodes 144 and 146 are joined by flexible member 148. Power from power controller 150 is directed through first electrical line 152 to first curved electrode 144 and through second electrical line 154 to second curved electrode 146. As can be seen in FIG. 9, when first curved electrode 144 moves in relation to second curved electrode 146, shaft 142 which joins object 136 to first curved electrode 144 moves as well. Such structure not only can be formed of half-spherical members, as described in the embodiment using magneto rheological fluid of FIGS. 7 and 8, but also can be in the form of an elongated trough having limited back and forth movements.

Although the present invention has been described with reference to particular embodiments, it will be apparent to those skilled in the art that variations and modifications can be substituted therefor without departing from the principles and spirit of the invention.

I claim:

1. A dampening bearing with an object disposed above said bearing, comprising:

a base;

a plurality of bearings disposed between said object and said base;

a rheological fluid disposed around said bearings, said bearings being disposed within said rheological fluid;

flexible means to contain said rheological fluid around said bearings, said means disposed between said object and said base; and means to stiffen said rheological fluid for preventing lateral movement of said bearings and dampening the movement of said object in relation to said base.

2. The device of claim 1 further including:

means to sense the position of said object in relation to said base; and means to control the degree of stiffening of said rheological fluid based on said position.

3. A dampening bearing with an object disposed above said bearing, comprising:

a base;

a plurality of bearings disposed between said object and said base;

an electro rheological fluid disposed around said bearings, said bearings being disposed within said electro rheological fluid;

flexible means to contain said electro rheological fluid around said bearings, said flexible means disposed between said object and said base;

means to produce an electric current; and means to pass said electric current through said electro rheological fluid, said electric current means able to be activated when desired for stiffening said electro rheological fluid to prevent lateral movement of said bearings and dampen the movement of said object in relation to said base.

4. The device of claim 3 further including:

means to sense the position of said object in relation to said base; and means to control the degree of stiffening of said electro rheological fluid based on said position.

5. A dampening bearing with an object disposed above said bearing, comprising:

a base;

a plurality of bearings disposed between said object and said base;

an electro rheological fluid disposed around said bearings, said bearings being disposed within said electro rheological fluid;

flexible means to contain said electro rheological fluid around said bearings, said flexible means disposed between said object and said base;

means to produce an electric current;

means to pass said electric current through said electro rheological fluid, said electric current means able to be activated when desired for stiffening said electro rheological fluid to prevent lateral movement of said bearings and dampen the movement of said object in relation to said base;

an upper electrode plate disposed above said bearings;

a lower electrode plate disposed under said bearings;

said flexible means to contain said electro rheological fluid including an elastic member extending from said upper electrode plate to said lower electrode plate;

said means to produce electric current and pass it through said electro rheological fluid further including a power source having a first and second pole;

means to connect said first pole to said upper electrode plate;

means to connect said second pole to said lower electrode plate; and means to direct current from said power source to said upper electrode plate and lower electrode plate such that said current passes through said electro rheological fluid to cause said electro rheological fluid to stiffen and dampen movement of said object in relation to said base when movement is desired to be dampened.

6. A dampening bearing with an object disposed above said bearing, comprising:

a base;

a plurality of bearings disposed between said object and said base;

a magneto rheological fluid disposed around said bearings, said bearings being disposed within said magneto rheological fluid;

flexible means to contain said magneto rheological fluid around said bearings, said flexible means disposed between said object and said base; and means to produce a magnetic field and pass said magnetic field through said magneto rheological fluid for stiffening said magneto rheological fluid to prevent lateral movement of said bearings and dampen the movement of said object in relation to said base.

7. The device of claim 6 further including:

means to sense the position of said object in relation to said base; and means to control the degree of stiffening of said magneto rheological fluid based on said position.

8. A method of dampening movement of a bearing between an object and a base, comprising the steps of:

placing said bearing within a rheological fluid;

containing said fluid:

activating said rheological fluid to stiffen said rheological fluid; and reducing said movement of said bearing by said stiffened fluid and thereby reducing said movement of said object in relation to said base.

9. The method of claim 8 wherein said step of activating said rheological fluid comprises the step of creating an electric field through said rheological fluid to stiffen said rheological fluid.

10. The method of claim 8 wherein said step of activating said rheological fluid comprises the step of creating a magnetic field through said rheological fluid to stiffen said rheological fluid.

* * * * *